April 16, 1963 J. KENDRICK 3,085,475
READING MEANS FOR INSTRUMENTS
Filed Jan. 12, 1960 2 Sheets-Sheet 1

INVENTOR
John Kendrick

April 16, 1963  J. KENDRICK  3,085,475
READING MEANS FOR INSTRUMENTS
Filed Jan. 12, 1960  2 Sheets-Sheet 2

INVENTOR
John Kendrick
his attorneys

United States Patent Office 3,085,475
Patented Apr. 16, 1963

3,085,475
READING MEANS FOR INSTRUMENTS
John Kendrick, Brentwood, Pa., assignor to Spek Instrument Company, Washington, Pa., a corporation of Pennsylvania
Filed Jan. 12, 1960, Ser. No. 1,971
2 Claims. (Cl. 88—74)

This invention relates to reading means for instruments. It relates particularly to reading means for elongated instruments from which readings are taken at various points along the instrument, generally by a reader whose position along the instrument may vary, the readings being taken at portions of the instrument remote from the position of the reader.

My invention is particularly applicable to vertically elongated instruments of which a good example is a manometer, although my invention may be otherwise applied. A manometer may stand considerably higher than a man's eyes and manometer readings may have to be taken as high as seven or eight feet above the floor. Also readings may have to be taken very close to the floor, possibly within a very few inches of the floor. It is difficult to take such high and low readings, particularly if accuracy is required. Prior to the present invention the high readings have been taken by the reader climbing up on a stepladder and the lower readings have been taken by the reader crouching or kneeling down on the floor. Climbing of the ladder and crouching or kneeling on the floor are a nuisance, involve undesirable and unnecessary physical effort, require time and introduce substantial possibility of inaccurate readings.

I provide reading means applicable to elongated instruments obviating the disadvantages above mentioned. While my reading means may be applied to instruments elongated in various directions the simplest example is a vertically elongated instrument such as a manometer. I provide for the taking of readings at all levels with comparative ease and without the necessity of the reader climbing a ladder or crouching or kneeling down on the floor. All readings can be taken while the reader stands in comfortable natural erect position. Moreover, I provide for the taking of the readings by readers of different heights standing in natural erect position. Whether the reader be five feet tall or shorter or six feet tall or taller he can in all cases make all readings throughout the length of the instrument while standing in natural erect position.

I provide, in combination, an elongated instrument from which readings are taken at various points along the instrument and reading means mounted in operative relationship to the instrument, the reading means comprising a first mirror disposed at an angle of about 45° to the length of the instrument, a second mirror also disposed at an angle of about 45° to the length of the instrument and so that it faces generally toward the instrument and toward the first mirror so that the reader may read the instrument by looking into the first mirror and thence into the second mirror and means mounting the second mirror for movement along the instrument so that the reader with the second mirror disposed in adjusted positions along the instrument may thus take readings at various points along the instrument. I preferably provide means adjustably mounting the first mirror in relation to the instrument so that it may be positioned at a location convenient for reading by the eye of a reader whose position along the instrument may vary. Such means provide for the taking of the readings by a reader of any height while standing in a natural erect position. I preferably provide an operating member disposed for convenient operation by the reader when looking into the first mirror for moving the second mirror along its mounting means.

I preferably provide an elongated mounting member extending generally parallel to the instrument together with carrying means extending along the mounting member carrying the second mirror and means for operating the carrying means to move the second mirror along the mounting means and consequently along the instrument. The carrier means may be endless, such, for example, as a chain operating over sprockets adjacent the ends of the elongated mounting member, and in such case I preferably provide an operating member, desirably disposed for convenient operation by the reader when looking into the first mirror, for operating the endless carrying means to move the second mirror along its mounting means and consequently along the instrument so that the reader with the second mirror disposed in adjusted positions along the instrument may take readings at various points along the instrument.

I further provide, in combination, an elongated instrument from which readings are taken at various points along the instrument and reading means mounted in operative relationship to the instrument, the reading means comprising a reading unit having mirror means adapted to be disposed at an angle of about 45° to the length of the instrument facing generally away from the instrument and toward the respective ends thereof, two other mirrors disposed respectively toward the respective ends of the instrument relatively to the reading unit and each disposed at an angle of about 45° to the length of the instrument and facing generally toward the instrument and toward the reading unit so that the reader may read the instrument by looking into said mirror means and thence into one of the second mentioned mirrors and means mounting the two second mentioned mirrors for movement along the instrument so that the reader with said one of the two second mentioned mirrors disposed in adjusted positions along the instrument may thus take readings at various points along the instrument. The reading means may comprise two mirrors fixedly mounted side by side each disposed at an angle of about 45° to the length of the instrument and facing respectively toward the respective ends of the instrument, or a single mirror may be provided mounted for movement between a position disposed at an angle of about 45° to the length of the instrument and facing generally toward one end of the instrument and a position disposed at an angle of about 45° to the length of the instrument and facing generally toward the opposite end of the instrument.

The reading means may be and preferably are mounted on the instrument although they may be mounted on supporting means adjacent the instrument. Desirably the reading means are releaseably clamped to the instrument.

I also provide reading means for application to an instrument from which readings are taken at various points along the instrument comprising elongated mounting means, a mirror disposed at an angle of about 45° to the length of the mounting means, means for moving the mirror along the mounting means to adjusted positions and clamping means for clamping the mounting means to an instrument. I preferably provide endless carrying means extending along the mounting means carrying the mirror together with an operating member carried by the mounting means for operating the endless carrying means to move the mirror along the mounting means to adjusted positions.

Other details, objects and advantages of the invention will become apparent as the following description of a present preferred embodiment thereof proceeds.

In the accompanying drawings I have shown a present preferred embodiment of the invention in which FIGURE 1 is a front elevational view of a manometer with my invention applied thereto;

Figure 1:
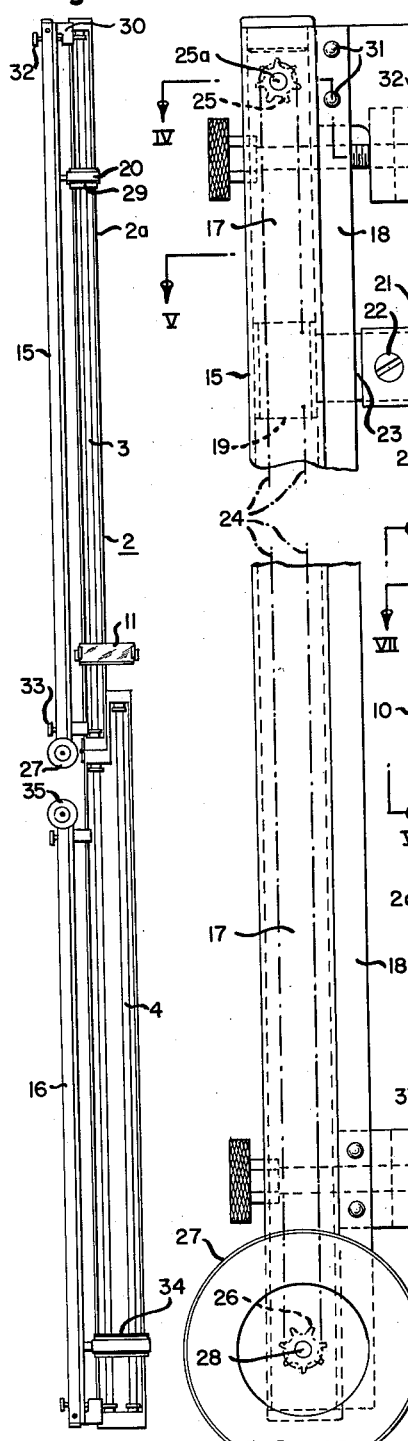
Figure 2:
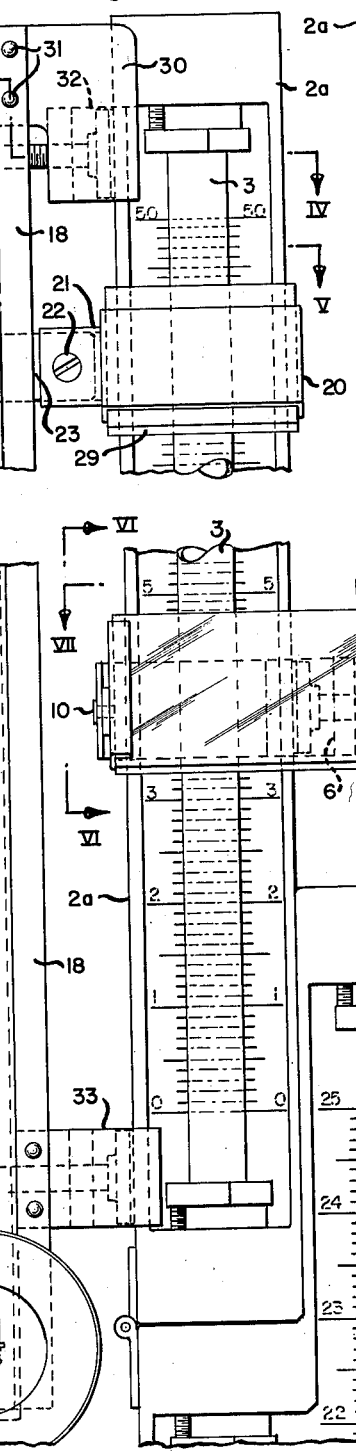
FIGURE 2 is an enlarged fragmentary front elevational view of a portion of the structure shown in FIGURE 1.
Figure 3:
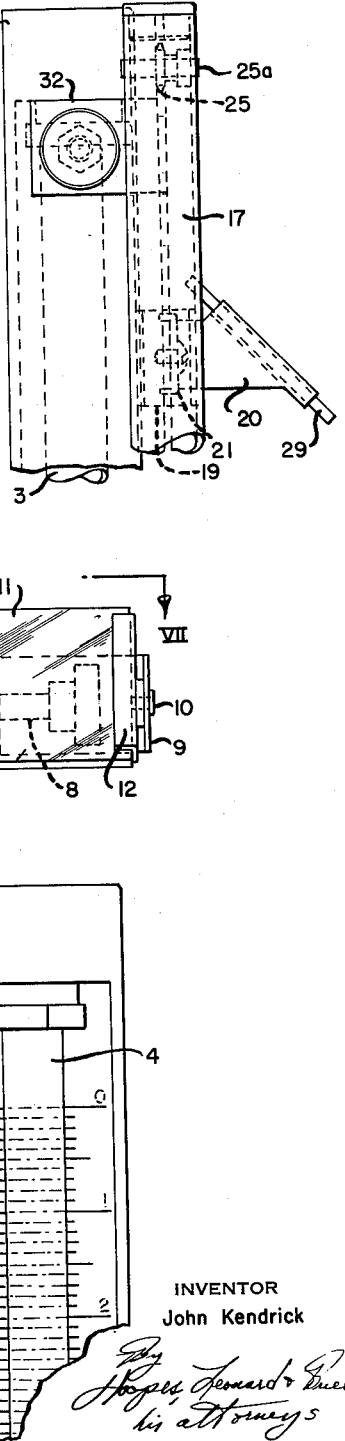
FIGURE 3 is a fragmentary side elevational view of a portion of the structure shown in FIGURE 2.
Figure 4:
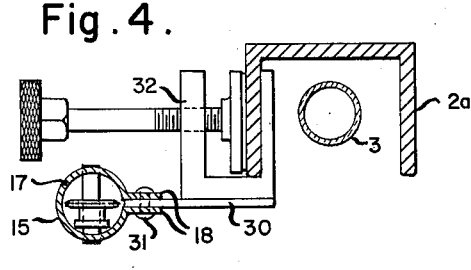
FIGURE 4 is a horizontal cross-sectional view taken on the line IV—IV of FIGURE 2.
Figure 5:
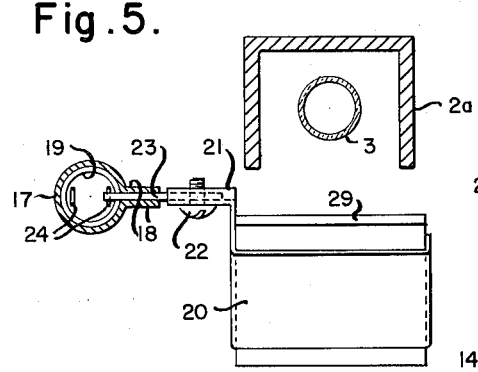
FIGURE 5 is a horizontal cross-sectional view taken on the line V—V of FIGURE 2.
Figure 8:
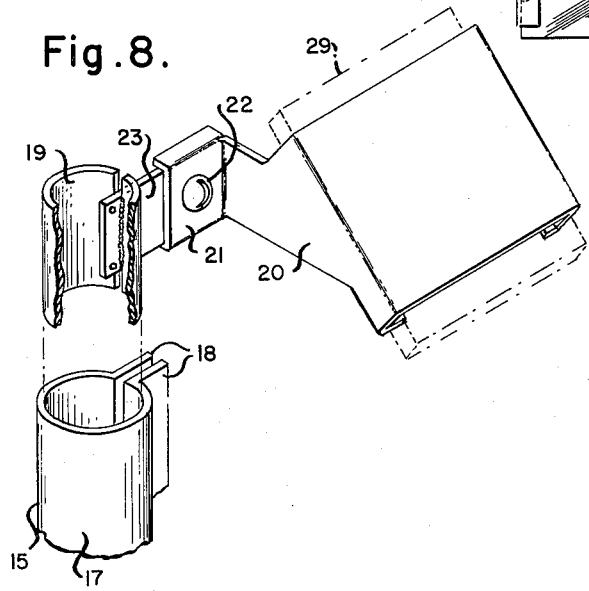
FIGURE 8 is a fragmentary perspective view with portions cut away illustrating part of the structure.

Referring now more particularly to the drawings, FIGURE 1 shows a manometer designated generally by reference numeral 2 which may be of conventional construction embodying frame means 2a in which is mounted a transparent tube, normally of glass or transparent plastic material, having vertical legs 3 and 4 connected together at the bottom (a manometer is sometimes called a "U tube,") the manometer tube having a suitable liquid such as water, alcohol or mercury therein. In the manometer shown the left hand leg 3, viewing FIGURE 1, extends to a height considerably above the top of the right hand leg 4. The total height of the manometer may be of the order of seven or eight feet or more. The present invention has nothing to do with the specific structure of the manometer and since manometers and the manner in which and the purpose for which they are used are very well-known I shall not further describe the structure of the manometer per se or the use thereof.

To facilitate reading the manometer at all elevations thereof I provide reading means mounted in operative relationship to the manometer and preferably mounted on the manometer frame although the reading means may be mounted on supporting means adjacent the manometer. One of the elements of the reading means is a reading unit designated generally by reference numeral 5 (FIGURES 6 and 7) and comprising a bracket 6 adapted for interengagement with a portion 7 of the manometer frame and a clamping screw 8. By such means the reading unit 5 is releasably clamped to the manometer. The reading unit may be clamped to the manometer at any desired elevation. Normally the reading unit 5 is clamped to the manometer 2 at the elevation of the eyes of the person who is going to take the readings.

The bracket 6 has parallel projecting arms 9 to which is trunnioned by trunnions 10 a mirror holder 12 holding a mirror 11 which is the "first mirror" above referred to. The mirror holder 12 has shoulders 13 disposed at an angle of 90° to each other and adapted selectively for engagement with stop means 14 on one or both of the arms 9 to position the mirror in either the full line position or the chain line position shown in FIGURE 6, i.e., facing generally outwardly away from the manometer and at an angle of 45° to the length of the manometer and selectively toward either end thereof. The trunnioned mounting for the mirror may be a friction mounting so that the mirror is frictionally held in whichever of its two positions to which it may be moved by the reader. When the mirror 11 is in the full line position shown in FIGURE 6 it is adapted to enable readings to be made at the upper portion of the manometer in relation to the leg 3 of the manometer tube and when it is in the chain line position shown in FIGURE 6 it is adapted to enable readings to be made at the lower portion of the manometer in relation to the leg 4 of the manometer tube.

In addition to the reading unit 5 the manometer is provided with other elements of the reading means comprising two elongated mounting members each extending generally parallel to the manometer, one at the upper portion of the manometer and the other at the lower portion of the manometer. The upper mounting member is designated 15 and the lower mounting member is designated 16 (FIGURES 1, 2, 4 and 8). The mounting members 15 and 16 are of similar construction so description of one will suffice for both.

The upper mounting member 15 comprises a generally tubular member 17 having at one side opposed lips 18. It may be an extrusion of aluminum or other suitable material. A bracket 30 has its extremity disposed between the lips 18 and fastened thereto by a rivet 31. The bracket 30 is provided with clamping means designated generally by reference numeral 32 which may be similar to the clamping means above described for clamping the reading unit 5 to the manometer frame. The clamping means 32 are disposed adjacent the top of the mounting member 15 and similar clamping means 33 are disposed adjacent the bottom thereof whereby the mounting member 15 is clamped to the manometer frame 2a.

Within the tubular member 17 is a relatively short generally cylindrical tubular guide 19 adapted to move axially within the tubular member 17. A bracket 20 has an arm 21 connected by a screw 22 to a plate 23 extending between the lips 18 of the tubular member 17 and connected internally of such member to the guide 19 and to an endless sprocket chain 24 mounted within the tubular member 17 and passing about an upper sprocket 25 carried by a shaft 25a spanning the tubular member 17 and a lower sprocket 26 carried by a shaft 28 spanning the tubular member 17. An operating knob 27 is mounted on the shaft 28. Turning of the knob 27 causes turning of the sprocket 26 and travel of the chain 24. Since the bracket 20 is connected through the plate 23 with the guide 19 and the chain 24 turning of the knob 27 causes the guide 19 and the bracket 20 to travel longitudinally of the tubular member 17 either upwardly or downwardly depending on the direction in which the knob is turned.

The bracket 20 carries a mirror 29 disposed in front of the upper leg 3 of the manometer tube and facing toward the manometer although inclined at an angle of 45° to the length of the manometer or to the vertical and facing generally downwardly toward the mirror 11.

The mounting member 15 is as above stated similar to the mounting member 16 and is similarly applied to the lower portion of the manometer. The mirror 34 at the lower portion of the manometer which is the counterpart of the mirror 29 at the upper portion thereof is disposed in front of the leg 4 of the manometer tube and faces toward the manometer although inclined at an angle of 45° to the length of the manometer or to the vertical and facing generally upwardly toward the mirror 11.

Figure 6:
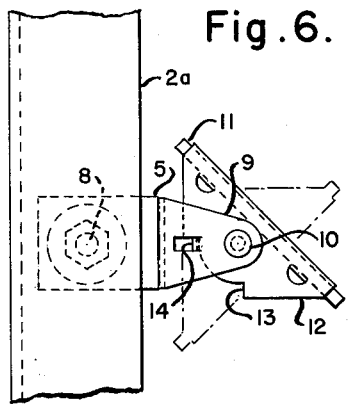
FIGURE 6 is a fragmentary vertical cross-sectional view taken on the line VI—VI of FIGURE 2.
Figure 7:
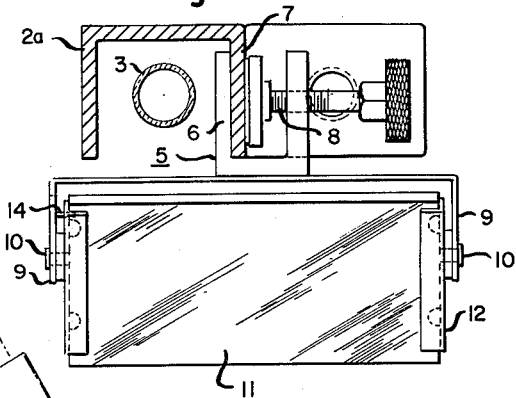
FIGURE 7 is a horizontal cross-sectional view taken on the line VII—VII of FIGURE 2.
Figure 9:
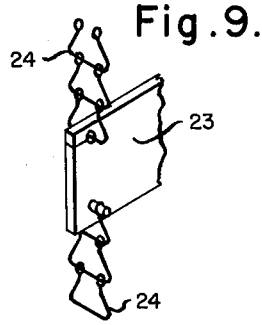
FIGURE 9 is a fragmentary diagrammatic view showing how a mirror is connected with the endless carrying means therefor.

When readings at the upper portion of the manometer are to be taken the reader moves the mirror 11 to the full line position shown in FIGURE 6 and reads through the left hand side of mirror 11, viewing FIGURE 1, and through the mirror 29. When readings at the lower portion of the manometer are to be taken the reader moves the mirror 11 to the chain line position shown in FIGURE 6 and reads through the right hand side of mirror 11, viewing FIGURE 1, and through the mirror 34.

At the outset the reader adjusts the reading unit 5 to the height of his eyes when standing erect so that he can take all readings in a natural and comfortable erect position. When a reading at the upper portion of the manometer is to be taken the mirror 11 is disposed in the full line position shown in FIGURE 6 and the reader looks through that mirror and through the mirror 29 and at the same time turns the knob 27 causing the mirror 29 to move up or down relatively to the upper leg of the manometer depending upon the direction in which the knob is turned. While watching through the mirrors the reader turns the knob 27 until the mirror 29 comes opposite the meniscus in the tube 3. The manometer is graduated either upon or beside the tube 3 and the reader makes note of the graduation opposite the meniscus which constitutes a reading of the manometer. Readings at the lower portion of the manometer along the leg 4 of the U tube are similarly made with the mirror 11 turned to the chain line position of FIGURE 6; the reader looks through the mirror 11 and the mirror 34 and turns the knob 35 which moves the mirror 34 in the same manner as turning of the knob 27 moves the mirror 29.

I thus provide means for reading a manometer or other elongated instrument at all portions therealong by a reader of any height standing erect in a natural and comfortable position. The knobs 27 and 35 are both located for convenient operation by the reader when looking through the mirror 11 so that the elevation of the mirrors 29 and 34 may be easily altered.

While I have shown and described a present preferred embodiment of the invention it is to be distinctly understood that the invention is not limited thereto but may be otherwise variously embodied within the scope of the following claims.

I claim:

1. In combination, an elongated instrument from which readings are taken at various points along the instrument and reading means mounted in operative relationship to the instrument, the reading means comprising a reading unit having mirror means adapted to be disposed at an angle of about 45° to the length of the instrument facing generally away from the instrument and toward the respective ends thereof, two other mirrors disposed respectively toward the respective ends of the instrument relatively to the reading unit and each disposed at an angle of about 45° to the length of the instrument and facing generally toward the instrument and toward the reading unit so that the reader may read the instrument by looking into said mirror means and thence into one of the second mentioned mirrors and means mounting the two second mentioned mirrors for movement along the instrument so that the reader with said one of the two second mentioned mirrors disposed in adjusted positions along the instrument may thus take readings at various points along the instrument.

2. In combination, an elongated instrument from which readings are taken at various points along the instrument and reading means mounted in operative relationship to the instrument, the reading means comprising a first mirror mounted for movement between a position disposed at an angle of about 45° to the length of the instrument and facing generally toward one end of the instrument and a position disposed at an angle of about 45° to the length of the instrument and facing generally toward the opposite end of the instrument, two other mirrors disposed respectively toward the respective ends of the instrument relatively to the first mirror and each disposed at an angle of about 45° to the length of the instrument and facing generally toward the instrument and toward the first mirror so that the reader may read the instrument by looking into the first mirror when in a selected one of said positions thereof and thence into the one of the second mentioned mirrors toward which the first mirror faces and means mounting the two second mentioned mirrors for movement along the instrument so that the reader with said one of the two second mentioned mirrors disposed in adjusted positions along the instrument may thus take readings at various points along the instrument.

References Cited in the file of this patent

UNITED STATES PATENTS

| | | |
|---|---|---|
| 1,309,478 | Jenkins | July 8, 1919 |
| 1,386,666 | Wickersham | Aug. 9, 1921 |
| 2,401,975 | Simjian | June 11, 1946 |
| 2,933,013 | Baker et al. | Apr. 19, 1960 |
| 2,935,908 | Phillips | May 10, 1960 |
| 2,949,777 | Ferron | Aug. 23, 1960 |

FOREIGN PATENTS

| | | |
|---|---|---|
| 703,430 | Great Britain | Feb. 3, 1954 |